3,107,205
Patented Oct. 15, 1963

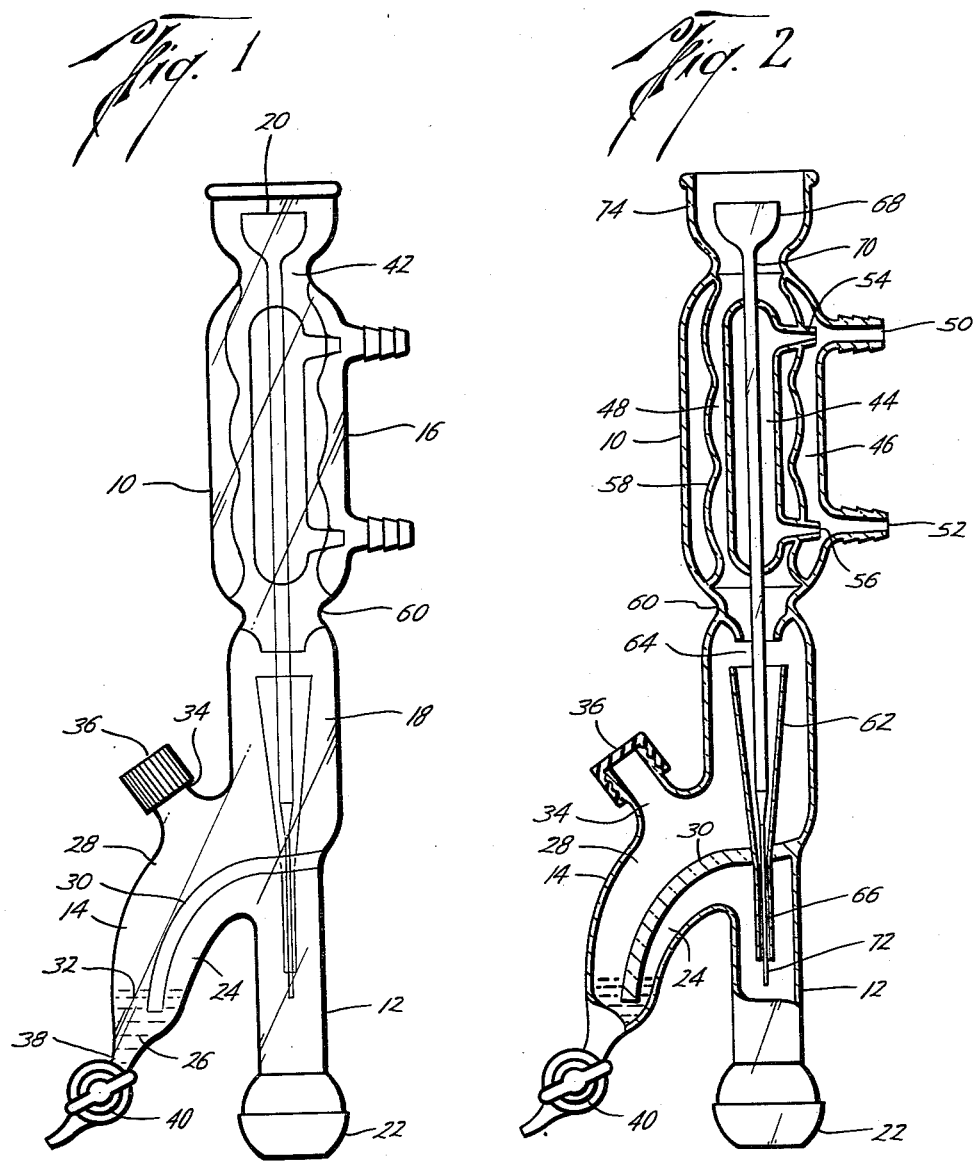

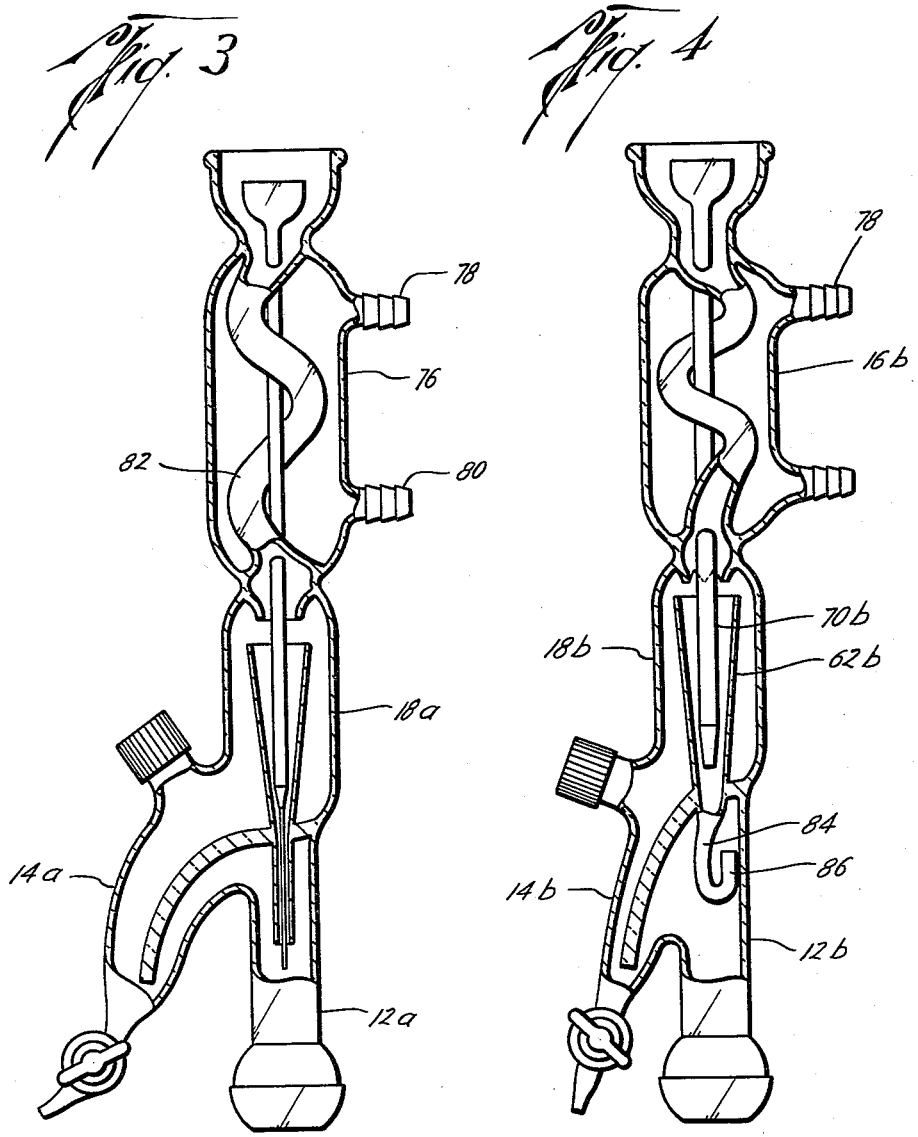

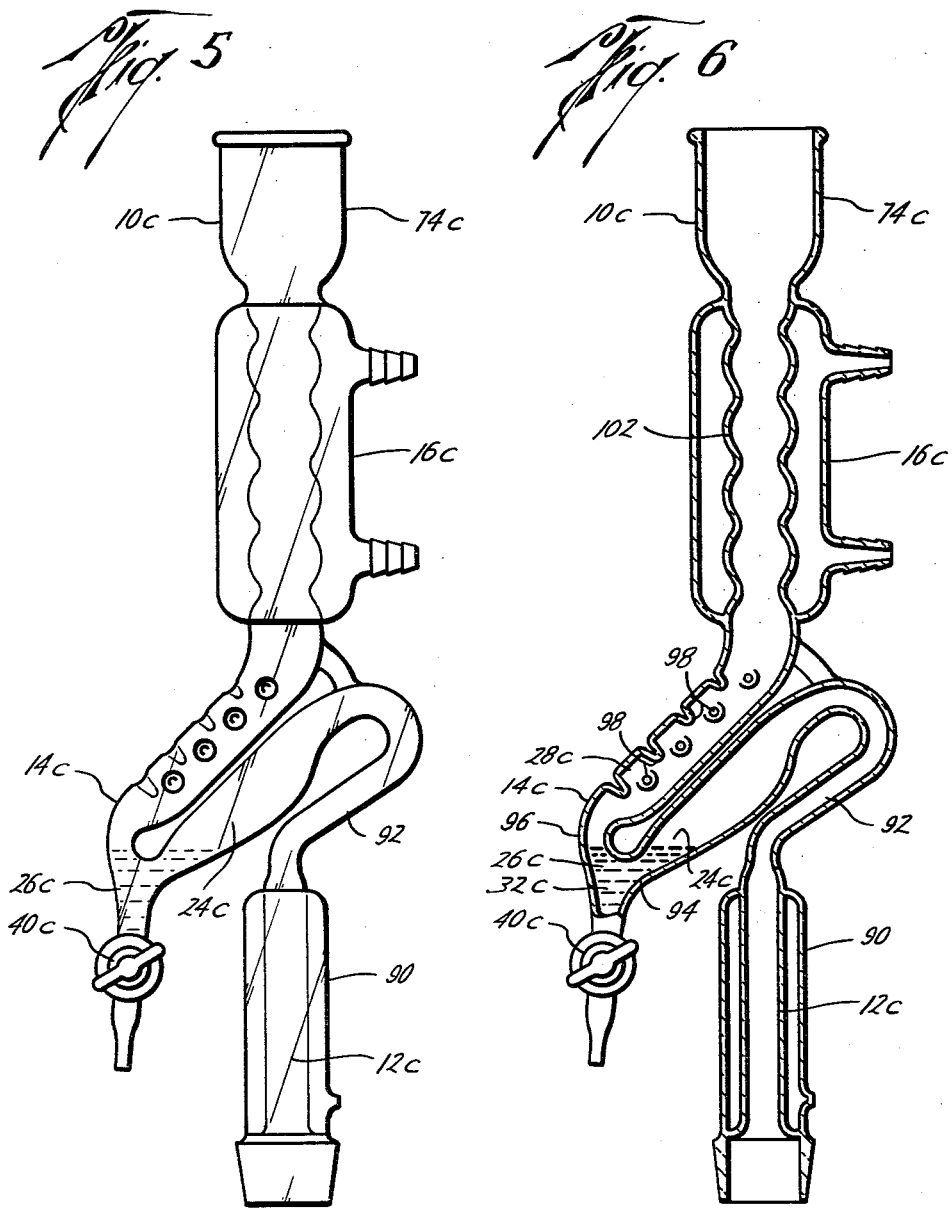

1

3,107,205
LABORATORY DISTILLATION APPARATUS
John J. Moran and Harold Wood, 230 Medical Arts Bldg.,
Houston 2, Tex.
Filed Sept. 16, 1960, Ser. No. 56,390
12 Claims. (Cl. 202—170)

The present invention relates to a laboratory distillation apparatus for the extraction and collection of volatile substances from solutions, and more particularly relates to a unitary type of laboratory distillation apparatus in which the distillation and extraction of volatile substances from solutions may be quickly and efficiently performed.

It is an object of this invention to provide an improved laboratory distillation apparatus in which the various steps required to distill and extract minute portions of volatile substances from solutions may be incorporated into a single apparatus for accuracy and efficiency in performing the extraction.

A further object of the present invention is the provision generally of a unitary laboratory distillation apparatus including a receiving chamber for receiving vapors from a boiling solution and forcing the vapors through an extraction chamber having an extraction solution and passing the vapors to a condenser.

Yet a further object of the present invention is the provision of a laboratory reflux distillation apparatus in which the condensate from the condenser section is collected and passed through a one way liquid trap back to the boiling solution but which prevents passage of vapors upwardly through this trap.

Yet a still further object of the present invention is the provision of a unitary glass laboratory reflux distillation apparatus in which the condensate from the condenser section is collected and passed through a capillary passageway back to the boiling solution and the provision of a feeder passageway having a capillary passageway to the boiling solution, the capillary passageways allowing the downwardly passage of liquids but preventing the passage of vapors upwardly.

A still further object of the present invention is the provision of a unitary laboratory distillation apparatus having a condenser section having inner and outer cooling jackets to increase the efficiency and cooling action of the condenser.

Yet a still further object of the present invention is the provision of a laboratory distillation apparatus which includes a receiving chamber to receive vapors from a boiling solution, and an insulation jacket about the receiving chamber to prevent premature condensation of the vapors and an inclined substantially U-shaped extraction chamber which receives the vapors from the receiving chamber and extracts and collects volatile substances from the vapor and a condenser chamber.

A still further object of the present invention is the provision of a unitary glass laboratory distillation apparatus which includes a receiving chamber to receive vapors from a boiling solution, an inclined U-shaped extraction chamber, the curved portion of said extraction chamber being sized and shaped to insure that all vapors must pass through the extraction fluid in the chamber, a restricted passageway between the receiving chamber and the extraction chamber which increases the pressure to provide a more thorough mixing process and to prevent flow back into the receiving chamber.

Other and further objects, features and advantages will be apparent from the following description of presently preferred embodiments of the invention, given for the purpose of disclosure, and taken in conjunction with the accompanying drawings, where like character references designate like parts throughout the several views, and where FIGURE 1 is an elevational view illustrating an apparatus according to the invention, FIGURE 2 is an elevational view, partly in cross-section, illustrating the apparatus of FIGURE 1, FIGURE 3 is an elevational view, partly in cross-section, of an apparatus of the present invention with a modified condenser section, FIGURE 4 is an elevational view, in cross-section, illustrating an apparatus of the present invention with a modified reflux passageway trap, FIGURE 5 is an elevational view, illustrating an apparatus of the present invention omitting the reflux passageway and, FIGURE 6 is an elevational view, partly in cross-section, illustrating the apparatus of FIGURE 5.

Referring now to the drawings, and particularly to FIGURES 1 and 2, the reference numeral 10 generally designates the unitary glass laboratory distillation apparatus of the present invention and generally includes a receiving chamber 12 for placing over and collecting vapors from a boiling solution (not shown) containing minute quantities of the volatile substance desired to be detected, an extraction chamber 14 which holds an extraction solution to extract volatile substances from the vapors, a condensing chamber 16 which condenses the unextracted vapors, a funnel or collecting chamber 18 which collects the distillate from the condenser chamber 16 and returns it to the receiving chamber 12 above the boiling solution, and a feeder passageway 20 leading through the apparatus to allow the insertion of materials through the apparatus and to the boiling solution.

At the bottom of the distillation apparatus a ground joint 22, preferably of the ball and socket or male type to connect to a flask (not shown) is provided since the flask is to contain a boiling solution from which volatile material is to be extracted. The joint 22 closes the top of the flask and insures that the boiling vapors from the flask or other boiling container will move upwardly into the receiving chamber 12.

Adjacent the receiving chamber is the extraction chamber 14. The extraction chamber 14 generally includes an inclined substantially U-shaped chamber having a leg or passageway 24 connected to the receiving chamber 12, a curved or bottom portion 26, and a top passageway 28. For convenience in manufacture the extraction chamber 14 may be made as a unitary chamber and a partition 30 inserted to form the lower and upper passageways 24 and 28, respectively. Of course, the U-shaped extraction chamber 14 may be made of a single continuous tube as shown in FIGURES 4 and 5. In either case, the lower chamber 24 is in fluid communication with the receiving chamber 12 and the vapors from the receiving chamber 12 are prevented by the partition 30 or other structure from ascending through the distillation apparatus 10 except through the lower extraction passageway 24, the curved portion 26, and the upper extraction passageway 28. The extraction chamber 14 is adapted to hold and contain an extraction solution which chemically extracts the volatile material which is to be extracted and collected from the vapor. This extraction solution 32 may be inserted into the extraction chamber through the inlet 34 which includes a cover or cap 36 which is thereafter placed on the inlet 34 during the actual distillation process to prevent loss of vapors. It is to be noted that the curved portion 26 of the extraction chamber is sized so that the correct amount of solution 32 when placed in the extraction chamber 14 will close the curved passageway 26 to insure that all vapors will pass through the extraction solution 32. An outlet 38 is provided in the extraction chamber in the lower portion of the curved portion 26 and is preferably provided with a stopcock 40 or other suitable valve means whereby the extraction solution containing the volatile material to be collected may be drained from the extraction chamber so that other required tests may be performed so that the amount of the volatile material may be determined after the conclusion of the distillation process.

The remaining vapors that pass through the extraction solution 32 and which are not absorbed therein pass to the condenser chamber 16 which is in communication with extraction passageway 28. Here it is noted that the upper end of the condenser chamber 42 is open to the atmosphere to allow the escape of the pressure that is created during the boiling. Therefore, it is important that the condenser chamber effectively and efficiently condense the vapor passing to that section through the extraction chamber in order that the vapors will not be exhausted and lost to the atmosphere. The condenser section 16 shown in FIGURES 1 and 2 provides a large surface area for cooling the incoming vapors. This condenser chamber provides an inner cooling chamber 44 and an outer cooling chamber 46 which enclose vapor chamber 48 into which the vapor rises. Outer cooling chamber 46 has an inlet 50 and outlet 52 which are connected to a cooling medium, generally water, by a suitable hose connection (not shown). Inner cooling container 44 has an inlet 54 and an outlet 56 as shown in FIGURES 1 and 2. The inlet 54 is aligned behind and spaced from inlet 50 and the outlet 56 is aligned with and spaced behind the outlet 52. Thus, the cooling medium, usually water, entering the inlet 50 enters into the outer jacket 46 and also depending upon the spacing and size of inlet 44 enters into inlet 44 in the cooling jacket 46. Similarly the cooling fluid leaving the outlet 56 combines with fluid leaving the outer chamber 46 and both are expelled through the outlet 52. Of course, if desired, the inlet 54 and outlet 56 could be spaced from and passed through the outer jacket 46 through separate inlets and outlets but that would only increase the number of hose connections and operations with which the laboratory technician would have to contend. Thus, it is noted that the combination of the inner and outer jacket provides an increased cooling area in the condenser chamber 16. It is also noted that the inner surface 58 of the outer jacket 46 has an undulating surface which increases the cooling surface area exposed to the vapor chamber 48.

It is to be noted that there is a reduced diameter portion 60 at the lower end of the condenser chamber 16 which collects and directs the condensate from the condenser section 16 so that the condensate will converge toward the center of the apparatus and above a funnel 62. The funnel 62 is spaced from the reduced diameter portion 60 thereby allowing a vapor passageway 64 from the extraction chamber 14 to the condenser chamber 16. Yet the condensate from the condenser section is collected and directed to the funnel 62 and directed through the funnel passageway 66 to the receiving chamber 12 and back to the boiling solution thereby providing a reflux action. It is to be noted that the passageway 62 is sized to provide a capillary action from which the condensate can drip downwardly, but which provides a trap to prevent vapors from the receiving chamber 12 from escaping upwardly through the passageway 66 and by passing the extraction chamber 14. This capillary passageway 66 thereby insures that all of the vapors trapped in the receiving chamber 12 will be directed to the extraction chamber 14 for passing through the extraction solution 32.

A feeder passageway 20 may be provided which extends through the interior of the laboratory distillation apparatus 10 so that additional materials may be inserted in the boiling solution without interrupting the distillation process. This passageway includes a funnel 68 at the top and an elongate tubular passageway 70 which extends through the condenser chamber, the funnel 62 and into the receiving chamber 12 above the boiling solution (not shown). It is noted that the elongated passageway 70 extends through the passageway 66 and thus coacts with that passageway to provide the capillary action in passageway 66. Of course, passageway 70 could be otherwise directed if desired. It is also to be noted that the lower portion of passageway 70 includes a capillary tube 72 to perform the same function as the capillary passageway 66, that is, to allow the passage downwardly of liquids, but to prevent the passing upwardly of vapors from the receiving chamber 12.

In addition, the top of the laboratory distillation apparatus 10 may be provided with a funnel 74 to aid in washing and cleaning the apparatus as will be more fully discussed hereinafter.

Of course various modifications of the different components of the present invention may be provided. FIGURES 4, 5, 6 and 7 illustrate modifications of different components of the present invention and the letters "a," "b" and "c" being applied to the parts corresponding to those in FIGURES 1 and 2 for convenience of reference.

Referring now to FIGURE 3, the apparatus herein shown is the same as the apparatus shown in FIGURES 1 and 2 with the exception of the condenser chamber. In FIGURE 3 a single jacket condenser chamber 76 is provided having inlet 78 and outlet 80 which are connected to a conventional cooling medium. The vapor chamber 82 is herein shown in the form of a spiral (here shown as a single spiral for convenience of the drawing although numerous spirals could be provided) for the purpose of supplying additional cooling area to insure that the vapors passing to the vapor chamber 82 will be thoroughly and efficiently subjected to the cooling action of the condenser section 76.

Referring now to FIGURE 4, the laboratory distillation apparatus here shown is similar to the previously described apparatus of FIGURE 3 with the exception that the reflux and funnel passageways to the receiving chamber 12 have been modified. As here shown the condensate passageway 84 leading from the funnel 62b includes a U-shaped portion 86 which provides a fluid trap instead of a capillary action trap and thus allows the passage of condensate from the condenser 16b through the funnel 62b downwardly through the U-shaped trap 86 into the receiving chamber 12b, but prevents vapors from traveling from the receiving chamber 12b through the passageway 84. By providing this fluid trap 86, the feeder passageway 70b need not include a capillary lower passageway but may merely drain into the fluid trap 86.

Referring now to FIGURES 5 and 6, a laboratory distillation apparatus is shown in which the reflux and feeder pasageways have been omitted and which apparatus is particularly useful in making micro protein bound iodine determinations. The dimensions of the extraction chamber are very important in order to accurately collect the micro quantities. It is to be noted that an insulation chamber 90, preferably air evacuated, is provided about the receiving chamber 12c to prevent premature vapor condensation in this chamber. Of course, the apparatus shown in FIGURES 1–4 could be provided with such an insulation chamber if desired.

A gooseneck portion 92 is provided leading from the receiving chamber 12c to the extraction chamber 14c and is of a restricted area, for instance 11 mm. in its outer diameter has been found to be satisfactory. This acts to build up the pressure of the vapor as it enters into the extraction chamber to provide a thorough scrubbing or mixing action between the vapor and the extraction fluid 32c. The restricted gooseneck passageway 92 is at an approximate angle of 140° from the axis of the receiving chamber and is connected to the upper end of the extraction passageway 24c and thus is remote from the extraction fluid 32c in order to prevent any flow back of the extraction fluid 32c into the receiving chamber and thus the boiling solution (not shown) due to the mixing of the vapor and the extraction fluid 32c. It is also noted that passageway 24c is enlarged, being approximately 19 mm. in diameter at its enlarged portion, to also prevent this flow back. Restrictions 94 and 96 are provided between the curved portion 26c and the passageways 24c and 28c being about 9 mm. in diameter, and the curved portion 26c of the extraction chamber is sized to hold a volume of approximately 1 ml. of fluid. This insures that all of the vapor must pass through the extraction fluid 32c and thus insures a thorough scrubbing action.

The extraction passageway 28c is then enlarged to reduce and limit any pressure surges to that passageway in order to prevent the loss of the solution out the apparatus through the condenser chamber 16c. And for that reason the extraction passageway is placed at an angle of approximately 135° from the axis of the condenser chamber.

A plurality of projections 98 into the extraction passageway 28c are provided, here shown as three rows of projections spaced 90° from each other, for again aiding in a thorough mixing of the vapors and the extraction solution 32c. Thus as the extraction solution 32c is bubbled by the heated vapors, the various structures here shown will insure adequate mixing of the vapor as it passes through the extraction solution, is condensed and again returns to the extraction solution, and is collected in the extraction chamber. Furthermore, this structure will insure that there will be no flow back into the receiving chamber 12c and will also insure that there will be no excessive boiling through the apparatus and out past the condenser 16c.

In use, the laboratory distillation apparatus 10 is placed over a container or flask (not shown) in which the solution containing the volatile material which is to be extracted by distillation is boiling. The joint 22 is placed adjacent the container or flask and makes a sealing connection therewith to trap the vapors from the boiling solution as they ascend into the receiving chamber 12. Prior to this time an extraction solution has been placed in the extraction chamber 14 through the extraction inlet 34 and the cap 36 has been secured to the inlet in the devices of FIGURES 1-4 or through the funnel 74c of the device shown in FIGURES 5 and 6. Because of the U-shape of the extraction chamber 14 the vapors from the receiving chamber 12 are directed through the lower extraction passageway 24 and through the extraction solution 32 in the curved portion 26 which extracts the volatile substance which is desired to be collected from the vapors and the remaining vapors continue upward through the upper extraction passageway 28 into passageway 64 and into the condensing chamber 16.

In the condenser section 16 a cooling medium, generally water, has been flowing into the inlet 50 and 54 into the cooling jackets 46 and 44, respectively, and out the outlets 56 and 52.

It is to be noted that the condenser 16 of FIGURES 1 and 2 is thus provided with inside and outside cooling surfaces about the vapor chamber 48 to provide an efficient and complete action. The vapor chamber 82 of FIGURES 3 and 4 and the chamber 102 of FIGURES 5 and 6 also provide extra cooling surface by having the chamber in the form of a spiral through the cooling jacket 76, or in an undulating shape, respectively.

In the apparatus of FIGURES 1 and 2, after the vapor is condensed in the condenser chamber 16 it moves downwardly and is collected and directed inwardly by the reduced diameter portion 60 below the condensing chamber. The condensate then drops into the funnel 62, goes through the capillary passageway 66, and back into the receiving chamber 12 where it is allowed to drip back into the boiling solution (not shown) to be redistilled so that the cycle may be repeated. It is noted that the condensate closes the capillary passageway 66 preventing the passage of vapors upwardly and thus prevents their escape and insures that the vapors will pass through the extraction chamber 14.

And if additional material is desired to be inserted into the boiling solution without interrupting the distillation process, the material is placed in the funnel 68 and allowed to pass downwardly through the feeder passages 70 into the feeder capillary tube 72 where it drips into the boiling solution and again forms a trap to prevent the escape of vapors.

The passageway 84 of FIGURE 4 does not include a capillary tube, but by providing the upturned portion 86 provides a liquid trap which allows the escape of condensate downwardly and back to the boiling solution, yet prevents the escape of vapors upwardly.

And in the device of FIGURES 5 and 6 the distillation apparatus 10c is placed over a container or flask (not shown) in which the solution containing micro quantities of a volatile material such as iodine which is to be extracted by disillation is boiling. The boiling vapors are passed through the receiving chamber 12c and are prevented there from premature condensation by the insulation jacket 90. The vapors then flow into the restricted gooseneck passageway 92 where they build up pressure and are discharged into the extraction chamber where they are extracted and collected in the extraction solution 32c similarly to the action of the devices of FIGURES 1-4. The unextracted vapor bubbles through the solution and into extraction chamber passageway 28c where the projections 98 additionally provide a mixing action. The vapor continues up and is condensed in the condensing chamber 16c and returns to the solution 32c through the projections 98 and the volatile material is extracted and collected and can be removed from the petcock 40c for other tests.

After the distillation process has been completed, the apparatus 10 may be quickly and easily cleaned by the passage of water, without or with a cleaning solution, through the funnels 68 and 74 through the various compartments.

Thus the present invention therefore provides a unitary laboratory distillation apparatus for the extraction and collection of volatile substances from solutions by providing an efficient device which minimizes the technician's labors and time and yet insures the accuracy and thoroughness of the distillation process.

The present invention, therefore, is well adapted to carry out the objects and attain the ends and advantages mentioned as well as others inherent therein. While presently preferred embodiments of the invention are given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. A distillation apparatus for the extraction of volatile substances from a boiling solution in a container comprising, a receiving chamber adapted to be placed adjacent said container receiving boiling vapors from said container, a U-shaped extraction chamber, a first end of said extraction chamber being in fluid communication with and receiving the vapors from said receiving chamber, said extraction chamber having an outlet valve positioned at the curved portion, a condenser chamber secured to the second end of the extraction chamber, said extraction chamber having a sealable opening for the insertion of material, said condenser chamber having a reduced diameter portion which allows the passage of vapors but collects and directs condensate, a funnel positioned below and spaced from the reduced diameter portion collecting the condensate from the condenser chamber, a passageway from said funnel to the receiving chamber to a point above the boiling solution in the container and in fluid parallel to said extraction chamber, a vapor trap in said passageway permitting the downward passage of condensate but preventing the upward passage of vapors, and a feeder passageway having a vapor trap coaxially aligned with said passageway and in communication with the receiving chamber.

2. The invention of claim 1 including an insulation jacket positioned above the receiving chamber.

3. The invention of claim 1 including projections in said extraction chamber above the normal level of extraction solution for mixing the vapor and the extraction solution.

4. The invention of claim 1 wherein the vapor traps include a capillary tube.

5. The invention of claim 1 wherein the condenser chamber includes a cooling jacket having an inlet and outlet for a cooling medium, and a spiral vapor passageway.

6. The invention of claim 1 wherein the condenser chamber includes an inner and an outer cooling jacket, each jacket having an inlet and outlet for a cooling medium, the inlet and outlet of the inner jacket, respectively, being aligned with and spaced adjacent the inside of the inlet and outlet of the outer jacket, respectively.

7. A distillation apparatus for the extraction of volatile substances from a boiling solution in a container comprising, a receiving chamber adapted to be placed adjacent said container for receiving boiling vapors from said container, said receiving chamber including a restricted gooseneck portion at its top, an inclined substantially U-shaped extraction chamber the lower end of which is connected to the restricted portion of the receiving chamber, a restriction between each leg of the U-shaped chamber and the curved portion of the extraction chamber, an outlet connected to the curved portion, a plurality of internal projections in the upper leg of the U-shaped extraction chamber, and a condenser chamber connected to the upper end of the U-shaped extraction chamber.

8. The invention of claim 7 including an insulation jacket surrounding the receiving chamber preventing premature condensation.

9. A glass distillation apparatus for the extraction of volatile substances from a container having a boiling solution of volatile substances comprising, an elongate body, a receiving chamber in the lower portion of said body adapted to be placed adjacent said container for receiving boiling vapors from said container, an extraction chamber having first and second ends and a lower portion adapted to hold an extraction solution, an outlet valve connected to said lower portion for draining said extraction fluid and entrapped volatile substances, a sealable inlet to said extraction chamber for adding matter to said extraction chamber, the first end of said extraction chamber being in communication with the receiving chamber, a condenser chamber in said body above and in fluid communication with the second end of the extraction chamber for condensing the vapor passing through said extraction chamber and into the condenser chamber, collecting means positioned in said body and below said condenser for collecting the condensate from the condenser chamber, a condenser passageway in said body between said collecting means and said receiving chamber directing the condensate to said receiving chamber, and a capillary tube in said passageway which permits the passage downwardly of condensate but prevents the passage of vapors upwardly.

10. The invention of claim 9 including a feeder passageway in said body leading from above said condenser chamber into said receiving chamber above the container, said feeder passageway being coaxially aligned with the condenser passageway and having a capillary tube which permits the passage downwardly of liquids but prevents the passage of vapors upwardly.

11. The invention of claim 9 wherein the condenser chamber includes an inner and an outer cooling jacket, each jacket having an inlet and outlet for a cooling medium, the inlet and outlet of the inner jacket, respectively, being aligned with and spaced adjacent the inside of the inlet and outlet of the outer jacket, respectively.

12. The invention of claim 9 wherein the extraction chamber includes said first and second ends being connected to said body, and a partition in said boy extending into the extraction chamber to divide the extraction chamber into first and second fluid passages in fluid communication with and joined to said lower portion.

References Cited in the file of this patent

UNITED STATES PATENTS

| | | |
|---|---|---|
| 1,066,877 | Best | July 8, 1913 |
| 1,317,262 | Bajda | Sept. 30, 1919 |
| 2,400,021 | Podbielniak | May 7, 1946 |
| 2,764,534 | Nerheim | Sept. 25, 1956 |
| 2,907,638 | Dryer et al. | Oct. 6, 1959 |